May 3, 1966     H. A. NEUMANN     3,249,337

HOSE GUIDE

Filed March 16, 1964

INVENTOR
HELMER A. NEUMANN

BY [signature]

ATTORNEY

United States Patent Office 3,249,337
Patented May 3, 1966

3,249,337
HOSE GUIDE
Hilmer A. Neumann, 3408 23rd Ave. S.,
Minneapolis, Minn.
Filed Mar. 16, 1964, Ser. No. 352,030
4 Claims. (Cl. 254—190)

This invention relates to a hose guide in the form of a generally cylindrical roller rotatably carried on a shaft designed to be inserted into the ground and the improvements to such hose guide roller structurally to enable it to more adequately perform its function that has hitherto been possible in other mechanisms designed for similar utility.

It is an object of the present invention to provide a roller carried upon a shaft in which the end extremity of the shaft provides a bearing surface and means to keep the bearing surface and the surface against which it bears lubricated.

It is a further object of the present invention to provide a hose roller in which the interior of the roller is relatively sealed from external moisture.

As will be generally understood it is necessary when pulling conventional garden hose from one place to another where the hose has one end secured to a water source to stretch or pull the hose around corners, this has long been recognized as a problem not only because of the damage which occurs to the hose through up-brading as it is pulled around corners, but in many instances because the hose will tend to cause the damage to certain growing areas over which it might be pulled. It is sometimes advantageous for example to provide means whereby a hose being extended may be pulled adjacent to flower beds, for example, without being dragged across those flower beds, and consequently ruining the flowers. In some instances several rollers are necessary in order to provide sufficient points against which the hose may roll without coming in contact either with obstructions which would damage the hose or with areas of ground which it is desired to keep apart from the hose that is being pulled.

I provide a hose roller having a shank which is relatively elongated having a sharpened tapered end which is generally conical adapted to be easily inserted into the ground to any desired depth. On the opposed end of the shaft I provide a generally concave end which is wired outwardly to provide a grease retaining cup in the concave portion with the flared periphery serving as a bearing and retaining seal to prevent the passage of the grease downward along the shaft. The roller itself which carries the hose is a generally cylindrical relatively elongated spool having annular flanged members at each end of the spool which serve to retain the hose in contact with the roller between the flanges. A centrally located recess is provided which extends axially in the direction of elongation of the roller to accommodate the shaft on which the roller is carried. The inner end of the recess is terminated within the roller with the portion of the roller which closes the recess being suitably shaped to cooperate with the portions of the shaft with which it comes in contact. The shaft is held within the recess of the roller by means of a bearing sleeve which is preferably moisture resistant, durable, and resistant to wear. I have found that several of the synthetic materials are suitable for the purpose of this bearing such as Nylon and Delron to mention two by their trade names, although it is recognized that various plastics presently available would prove suitable as well.

The bearing sleeve of suitable material is of a diameter to snugly fit the diameter of the recess and is of a length to be accommodated within the length of the recess. The sleeve includes an annular shoulder designed to bear against the flared peripheral end of the shaft in bearing relation. Means are provided to retain the sleeve within the recess which further serves to secure the shaft in the desired position.

I have found that my invention is particularly suited to outdoor use since by my construction it is seen that no access to the interior of the roller is provided from the upper end since no recess is provided, and moisture, dirt, and foreign substances are prevented from entrance into the interior of the roller by the snug fitting of the sleeve against the sides of the recess, the seal provided between the flared end of the shaft and the shoulder of the bearing and the seal between the bearing itself and the inner spool surface against which it bears at its upper end. By this particular construction not only is the roller freed from the usual problems which have previously frustrated other inventors, but in addition the roller movement is free since the shaft itself bears against the inner end of the recess in a practically nonexistent frictional relationship.

It is a further object of the present invention to provide a roller spool rotatably carried on a shaft having a recess in which the shaft is rotatably secured whereby the roller itself can be used to urge the shaft into engagement with the ground without changing the relatively nonexistent frictional relationship between the shaft and the roller.

It is a further object of the present invention to provide means for retaining a lubricant between the movable portions of the roller and the shaft.

I accomplish the foregoing object by means of a concave recessed portion in the end of the shaft within which the lubricant may be retained. I have found that the device is thereby easily enabled to function smoothly without the friction which is normally found in devices of this character. In addition the lubricant is sealed from contamination by outside sources thereby preventing damage to the interior of the hose roller guide.

It is a further object of the present invention to provide a shaft on which the roller is rotatably carried having an end-play between the end of the shaft and the end of the recess in which the shaft is inserted thereby enabling the roller to be forced against the shaft when inserting the shaft into the ground, but avoiding the frictional engagement of the shaft against the end of the recess previously described through the medium of the intervening lubricant. Accordingly, the device is unusually free in its rotatable relationship to the shaft on which it is carried.

I provide means to retain the shaft and sleeve within the recess so that the sleeve is unable to move thereby eliminating problems through the entrance of moisture or foreign materials.

The entire device may be made of materials which are relatively free from corrosion or other damage by exposure to the elements, the device being durable, easy to use, efficient in its operation, and inexpensive.

These and other objects and particular advantages will be more particularly described in the accompanying specifications taken in conjunction with the drawings herein in which.

As may be clearly seen in the views of the invention, I provide a device which is remarkably efficient and constituting a marked advance over other devices in the field.

Figure 1:
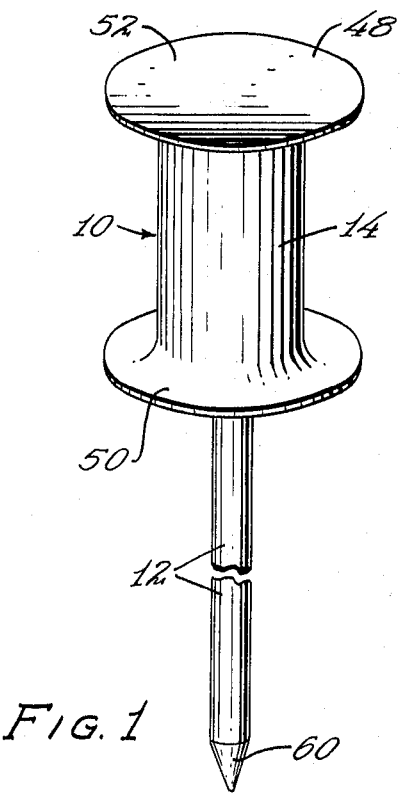
FIGURE 1 is a perspective view of the hose roller guide in assembled relation with the elongated shaft on which it is rotatably carried.

In FIGURE 1 I show a hose roller guide generally numbered 10, the hose roller guide 10 comprising a ground engaging generally cylindrical shaft 12 and a generally cylindrical roller spool generally numbered 14 which will be further described rotatably carried on the shaft 12. The shaft is preferably made of a hardened material so as to enable the shaft to be inserted into the ground. I have found that various materials are suitable for this purpose, but preferentially I employ an elongated shaft made of steel, aluminum, and the like.

Figure 2:
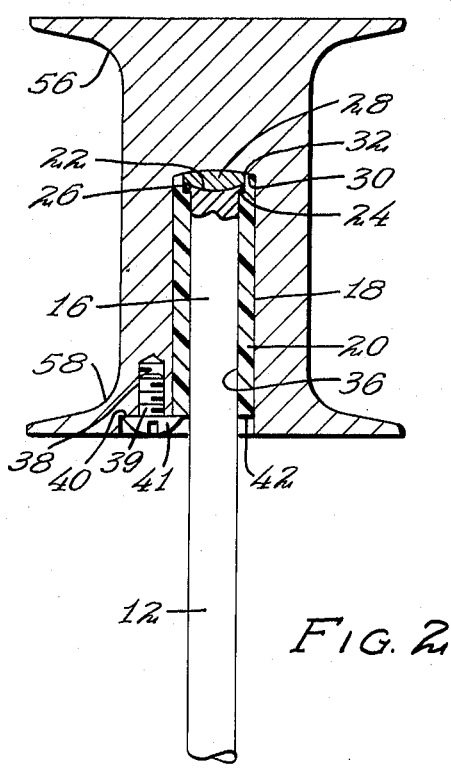
FIGURE 2 is a sectional view in elevation through the roller particularly showing the relation between the shaft end and the sleeve bearing, and further showing the relation of the end of the recess of the hose roller to the sleeve bearing end and the flared bearing seal end of the shaft.

As may be seen in FIGURE 2 the shaft 12 has an upper end 16 inserted within a recess 18 which is centrally disposed within the relatively elongated roller spool 14, the recess 18 being of a length and diameter to accommodate the end of the shaft 12 designed to be inserted within the recess, and the bearing sleeve 20 in which the shaft 12 is rotatable. The spool 14 is of a relatively durable, waterproof, nonabsorbent material such as one of the plastics, steel, aluminum and the like, but in general, however, I prefer to make the spool of a similar nature to that used in the shaft although obviously such is not necessary. The bearing sleeve 20 is similarly of a relatively durable, waterproof, nonabsorbent material such as plastic or one of the other synthetic bearing materials which are presently marketed under such trade names as nylon, Delron, and the like, and it is to be understood that various other thermoplastic materials having the same general characteristics of nonabsorbability of moisture and freedom from undue wear as well as older conventional bearing materials will serve equally as well.

As may be seen in FIGURE 2, the sleeve 20 fits snugly against the enclosing side of the recess 18 in order to prevent the entrance of moisture and foreign materials into the recess between the outside surface of the sleeve and the spool surface which encloses it. The sleeve is of a length to correspond to the length of the recess, the sleeve being adapted to engage snugly against the end of the recess to provide a seal not only as to moisture and foreign materials entering, but to prevent loss of the lubricant which is carried within the concave recess 22 in the enclosed end portion of the shaft within the recess. As may be seen in FIGURE 2, adjacent the inner end of the sleeve bearing I provide an annular shoulder 24 adapted to be a bearing surface as a seal. The width of this annular shoulder is such as to accommodate the bearing end of the shaft with which it cooperates. The end of the shaft 12 as shown in the view of FIGURE 2 is flared outwardly along its periphery, the flared circumferential periphery being numbered 26 and being in the form of an annular bearing edge designed to cooperate with the annular shoulder 24 of the sleeve 20. A lubricating material such as the grease 28 is provided to reside in the concave end of the shaft in order to enable the shaft to be more readily adapted to carry the spool rotatably.

Preferably, the inner end of the bearing 30 is conformably shaped so as to snugly fit against the cooperating surface of the spool forming the end of the recess, the surface being numbered 32. The sleeve is generally cylindrical in the preferred form of construction shown, but it is obvious that the sleeve could be in any shape which would conform to the recess in which it is retained, the sleeve providing the sealing arrangement and bearing surface for the shaft. In other words, a generally rectangular sleeve would function adequately so long as it provided the necessary aperture within which the shaft would reside and the bearing surface for the shaft bearing end edge.

Figure 4:
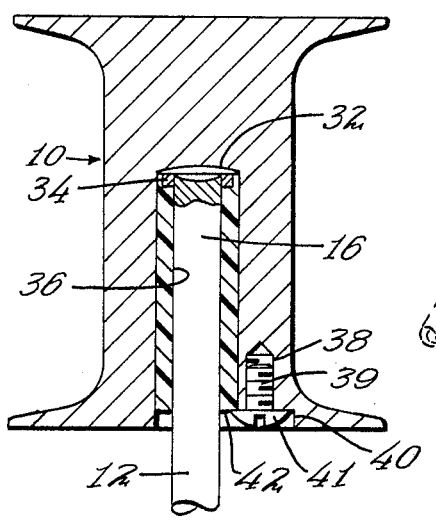
FIGURE 4 is a modified form of construction in which the flared bearing end of the shaft includes an annular bearing and the means securing the shaft and bearing in relation to the spool recess includes a retaining ring.

A modified view of the construction is shown in FIGURE 4 in which the end of the shaft designed to be retained within the recess includes an annular bearing secured to the end of the shaft and encircling the shaft adjacent its end, the bearing being made of a suitable bearing material which is preferably non-corrosive such as brass for example. The annular bearing which encircles the end of the shaft upper end 16 has been generally numbered 34 and cooperates with the annular shoulder 24 of the sleeve. The modification simply provides the bearing 34 in tightly seated encirclement of the end of the shaft rather than in the flared bearing end shown in FIGURE 2.

It will be apparent that the recess is enclosed from all sides and at one end, being open only at the end through which the hollow sleeve bearing and shaft are inserted. This enables the roller to be kept free of moisture and foreign materials.

As may be clearly seen in FIGURES 2 and 4, I provide a certain amount of end-play between the end of the shaft and the end of the recess 32, this space being taken up to a certain extent by the lubricant such as the grease previously described. In addition, this space enables the shaft to freely rotatably carry the spool without the frictional engagement which would occur otherwise. It will be apparent that when inserting the shaft into the ground that the end surface of the recess 32 of the spool will press against the end of the shaft, and upon release of such pressure the end to end contact between the end of the shaft and the recess end will be substantially if not completely eliminated by the lubricant. This is an obvious and apparent advantage since the device must be forced into the ground, but it is important that the free rotatable relation between the spool and the shaft not be disturbed, and my particular arrangement of structures accomplishes this particularly well.

The relation between the shaft and the inner surface 36 of the hollow bearing sleeve 20 is such that the shaft is enabled to freely rotate within the bearing sleeve when not in the ground, or putting it in another form, the roller spool 14 is freely rotatable without frictional loss between the inner surface 36 of the sleeve and the portions of the shaft 16 which it encloses. Preferably, of course, tolerance between the upper end of the shaft and the encircling bearing is such that there is no tendency of the spool to wobble from side to side when rotated, although the spaced relation between the shaft and the inner surface of the sleeve is such as to prevent undue frictional engagement.

I provide as is shown in FIGURES 2 and 4 the means for retaining the bearing sleeve and the shaft within the recess, a preferred form of construction being shown in FIGURE 2. In this construction I provide a screw receiving recess generally numbered 38 having an enlarged outwardly disposed head recess generally numbered 40 which is adapted to enclose the head of the screw so as to enable the surface of the spool adjacent the ground or other surface to be flush. The screw body is numbered 39 and the head of the screw 41. It will be understood that the screw receiving recess may be threaded to receive a screw body that is threaded such as is shown in the view, or a self tapping screw may be used alternatively. As will be understood, the action of screw head 41 in engagement with the end 42 of the bearing sleeve 20 will force the bearing 20 into the recess and into tight engagement against the spool surface 32 which terminates the recess thereby holding the bearing 20 in place and the shaft 12 as well. Normally, I provide a tolerance of a slightly greater amount $1/128$, preferably approximately $1/64$ of an inch longer sleeve bearing being used than is necessary for the length of the recess in order to enable the screw to provide sufficient compression of the bearing against the end surface of the recess.

As the sleeve bearing does not rotate, it is possible to provide an unusually secure and tight seal.

Figure 3:
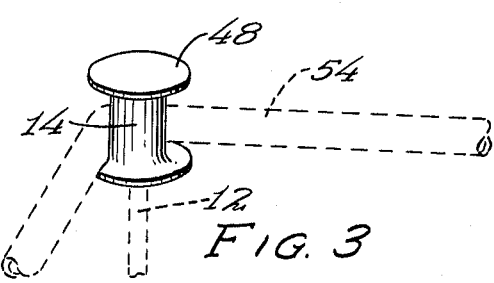
FIGURE 3 is a view in elevation of a hose in rollably guiding relation to the hose roller guide, the hose and shaft being shown in broken outline.

Returning again to the view shown in FIGURE 1, the spool 14 has an opposed pair of annular flange members 48 and 50 at each end of the spool 14. The upper surface of the flange 48 which is normally furthest from the ground is a solid surface with no means of access to the interior of the spool and the recess 18. This surface I have numbered 52 for purposes of description. This surface 52 may be finished smoothly or may be designed to carry labels or other indicating indicia thereon. The flanges 48 and 50 serve to retain the hose such as is shown in FIGURE 3 and generally numbered 54 from slipping off the roller spool 14 as the spool rotates. The flanges in preferred construction are joined to the cylindrical spool 14 by arcuate fillets 56 and 58 as is clearly seen in FIGURE 2. The fillets 56 and 58 are of a radius so as to provide a smooth complementing surface for the hose as well as for the purpose of providing additional strength when less structurally strong materials are used other than metals such as steel for example. It is of course apparent that modifications can be made in the use of the fillets such as providing ribs to serve as the structure stiffening if so desired. Since such changes are believed to be obvious and their function is well understood, it is not believed necessary to include them.

The spool including the accmpanying flanges may be made in any desired size to accommodate hoses of various diameters. Further, the extent to which the diameter of the flanges is greater than the diameter of the spool may be altered to serve particular purposes and diameters of hoses being used.

The outer surface of the spool 14 is preferably of a substantially smooth texture to enable the hose to slide freely across the roller as the roller turns, but which may be grained in the direction of rotation in order to prevent the hose from tending to work upwards or downwards vertically upon the roller and thereby slip beyond the upper or lower flange. Since the roller rotates so freely, the spool surface obviously does not have to be made completely smooth thereby enabling the hose to rotate the roller as it is pulled against the surface of the spool and also enabling inexpensive production models to be made. Correspondingly, as previously indicated graining ridges or roughening of the spool surface in the direction of rotation may be provided for the purpose previously indicated.

FIGURE 3 shows a hose in relation to the spool 14.

Turning once again to the view of the shaft shown in FIGURE 1, the ground engaging portion of the shaft 12 has an end generally numbered 60 which in preferred form is in the shape of a tapered cone. It is obvious that the end of the shaft 12 should be of such a nature as to enable the shaft to be readily inserted into the ground, but further being of a sufficient thickness or diameter as to be not subject to breakage. I have found that the cylindrical shaft which I employ preferably provides this characteristic. The length of the shaft is of sufficient elongation so as to provide the desired resistance to being pulled along the surface in which it is engaged so as to prevent the shaft being pulled into an angled relation to the ground or other surface other than its normal upright position.

It is of course obvious that the end of the shaft may be modified at the lower end so as to provide a relatively spade type end. I have found that in certain localities where the depth of the soil is loose is rather limited, such as in those areas where a hard clay base underlies the ground or rock is to be found the shaft, obviously, must be much shorter and therefore a spade end which is relatively broad at its lower point provides the necessary resistance to the shaft and roller being puled into a tilted relation to the surface in which the shaft is engaged.

In addition, I have found that in some instances when hoses are to be used on hard surfaces such as patios having blocks as their surface, that it is necessary to modify the surface engaging portion of the shaft for use with suction cups and the like.

Since these are obvious modifications and are believed within the scope of the disclosure, further description is believed unnecessary.

These and other modifications and particular advantages which are deemed mechanically obvious will not be further described.

In accordance with the Patent Office statutes I have provided the description of the purpose, function, and structure of my invention and have set forth the best embodiments thereof, but I desire to have it understood that obvious changes and modifications may be made within the scope of the accompanying claims without departing from the spirit of my invention.

I claim:

1. A hose roller guide including:
   (a) a generally cylindrical, relatively elongated spool body having a pair of opposed end flanges of substantially greater diameter than said spool body,
   (b) said spool having a centrally disposed, relatively elongated recess, axially extending inwardly in said spool body in the direction of elongation of said spool body through one said flange and terminating short of said other flange,
   (c) an elongated shaft rotatably carrying said spool body having a generally cylindrical end portion disposed in said recess of said spool body,
   (d) said end portion including an annular bearing means extending outward of said shaft adjacent the end extremity of said shaft portion,
   (e) an elongated hollow sleeve bearing axially disposed on said shaft end portion in said spool body recess,
   (f) said shaft being rotatable in said sleeve,
   (g) said sleeve bearing having an inner annular shoulder adjacent one end adapted to provide a bearing seal surface cooperable with said shaft bearing means,
   (h) fastening means secured to said spool body in engagement with said sleeve whereby said sleeve and said shaft end portion are held in said spool body recess,
   (i) said sleeve bearing being held in nonrotatable relation to said spool body by said fastening means,
   (j) the other end portion of said shaft adapted to hold said shaft in upright relation to a supporting surface.

2. The structure of claim 1 and in which said recess has an open outer end and a closed inner end, said sleeve being in snugly fitted relation to said closed end, said annular shoulder of said sleeve bearing being spaced from said closed end and said shaft bearing means being in overlying relation to said annular shoulder when said spool body is in a normal upright position, the space between said closed end and said shaft bearing means adapted to contain a lubricant.

3. The structure of claim 2 and in which the end of said shaft end extremity includes a concave depression adapted to hold a viscous lubricant, a viscous lubricant in said concave depression whereby said shaft end is in lubricated relation to said closed end of said recess.

4. A hose roller guide comprising:
   (a) a generally cylindrical relatively elongated spool body having a pair of opposed end flanges of substantially greater diameter than said spool body,
   (b) said spool body having a centrally disposed relatively elongated recess having an open end and an end closed by a portion of said body axially extending inwardly in said spool body in the direction of elongation of said spool body through one said flange and terminating short of said other flange, (c) an elongated shaft having a generally cylindrical end portion disposed in said spool body recess to rotatably carry said spool body;
(d) said end portion including annular bearing means extending outward of said shaft in a plane generally parallel to said closed end of said recess adjacent the end extremity of said shaft end portion,
(e) an elongated hollow sleeve bearing having an axially extending, cylindrical opening therein disposed on said shaft end portion in said recess,
(f) said sleeve bearing being of a length approximating the length of said recess,
(g) said sleeve bearing having an inner annular shoulder adjacent one end spaced from the closed end of said recess cooperable with said shaft bearing means, said one end of said bearing being the end of the said bearing closest in proximity to said closed end of said recess,
(h) said shaft being rotatable within said sleeve bearing,
(i) said shaft being movable in said sleeve bearing toward and away from said closed recess end, said shaft being limited in movement toward said closed recess end by said end, and limited in movement away from said closed recess end by said annular shoulder of said sleeve bearing,
(j) said sleeve bearing being in snugly fitted relation to said shaft bearing means and said shaft,
(k) fastening means secured to said spool in engagement with said sleeve whereby said sleeve is held in tightly fitted nonrotatable relation in said spool body recess,
(l) the other end of said shaft adapted to hold said shaft in upright relation to a surface such as the ground.

References Cited by the Examiner

UNITED STATES PATENTS 1,968,357 7/1934 Schmiett.
2,501,407 3/1950 Olsen.

SAMUEL F. COLEMAN, *Primary Examiner.*

HUGO O. SCHULZ, *Examiner.*

H. C. HORNSBY, *Assistant Examiner.*